United States Patent
Connelly et al.

(10) Patent No.: US 10,715,884 B2
(45) Date of Patent: *Jul. 14, 2020

(54) PRIORITIZED CALL SESSIONS

(71) Applicant: Comcast Cable Communications, LLC, Philadelphia, PA (US)

(72) Inventors: Michael Connelly, Philadelphia, PA (US); Jeffrey Lewis, Wayne, PA (US); Bhagabati Maharana, Bensalem, PA (US); Louis Rubin, Ruskin, FL (US); Richard Vetter, Landsdowne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,362

(22) Filed: Oct. 10, 2018

(65) Prior Publication Data

US 2019/0281368 A1    Sep. 12, 2019

Related U.S. Application Data

(63) Continuation of application No. 15/622,466, filed on Jun. 14, 2017, now Pat. No. 10,178,446, which is a
(Continued)

(51) Int. Cl.
| | |
|---|---|
| *H04M 11/00* | (2006.01) |
| *H04Q 3/70* | (2006.01) |
| *H04M 7/00* | (2006.01) |
| *H04M 11/04* | (2006.01) |
| *H04M 3/20* | (2006.01) |
| *H04M 3/42* | (2006.01) |

(52) U.S. Cl.
CPC ............... *H04Q 3/70* (2013.01); *H04M 3/20* (2013.01); *H04M 7/0069* (2013.01); *H04M 11/04* (2013.01); *H04M 3/42314* (2013.01); *H04M 2242/04* (2013.01)

(58) Field of Classification Search
CPC .................................. H04Q 3/70; H04M 3/20
USPC ...................... 379/37, 220.1, 201.1; 370/352
See application file for complete search history.

(56) References Cited

U.S. PATENT DOCUMENTS

| | | |
|---|---|---|
| 4,258,357 A | 3/1981 | Browell |
| 4,718,079 A | 1/1988 | Rabito |
| (Continued) | | |

FOREIGN PATENT DOCUMENTS

EP    0863653 A2    9/1998

OTHER PUBLICATIONS

Aug. 19, 2011, submission in European Patent Application 10171558.
(Continued)

*Primary Examiner* — William J Deane, Jr.
(74) *Attorney, Agent, or Firm* — Banner & Witcoff, Ltd.

(57) ABSTRACT

A local network call handling device is configured to establish multiple concurrent call sessions between local network end devices and an external network. When a prioritized end device attempts to establish a call session, the call handling device may initially determine if a first call session identifier is available. If so, the call session can be established using that first identifier. If the first identifier is in use for a call session of another end device, the call handling device may either use a different call session identifier for the prioritized end device session or may drop a pre-existing call session to free an identifier for use in connection with the prioritized end device.

20 Claims, 10 Drawing Sheets

Related U.S. Application Data continuation of application No. 14/151,102, filed on Jan. 9, 2014, now Pat. No. 9,716,925, which is a continuation of application No. 13/972,165, filed on Aug. 21, 2013, now Pat. No. 8,654,961, which is a continuation of application No. 12/544,551, filed on Aug. 20, 2009, now abandoned.

(56) References Cited

U.S. PATENT DOCUMENTS

| | | | |
|---|---|---|---|
| 5,131,019 | A | 7/1992 | Sheffer et al. |
| 5,233,640 | A | 8/1993 | Kostusiak |
| 5,323,444 | A | 6/1994 | Ertz et al. |
| 5,424,708 | A | 6/1995 | Ballesty et al. |
| 5,862,201 | A | 1/1999 | Sands |
| 6,072,858 | A | 6/2000 | Bellin |
| 6,507,648 | B1 | 1/2003 | Golka et al. |
| 6,825,762 | B2 | 11/2004 | Giacopelli et al. |
| 7,149,514 | B1 | 12/2006 | DePani et al. |
| 7,286,049 | B2 | 10/2007 | Martin |
| 7,825,796 | B1 | 11/2010 | Simon |
| 7,848,505 | B2 | 12/2010 | Martin et al. |
| 8,704,646 | B2 | 4/2014 | Beach et al. |
| 2003/0101459 | A1 | 5/2003 | Edson |
| 2003/0128115 | A1 | 7/2003 | Giacopelli et al. |
| 2003/0169854 | A1 | 9/2003 | Yoshitani |
| 2005/0047574 | A1 | 3/2005 | Reid |
| 2007/0121923 | A1 | 5/2007 | Pildner |
| 2008/0304656 | A1 | 12/2008 | Reed et al. |
| 2009/0059900 | A1 | 3/2009 | Abraham |
| 2010/0312832 | A1 | 12/2010 | Allen et al. |
| 2011/0044318 | A1 | 2/2011 | Sharma et al. |

OTHER PUBLICATIONS

European Search Report for EP10171558 dated Dec. 14, 2010.
Canadian Office Action—CA App 2,713, 046—dated Aug. 18, 2016.
May 3, 2017—European Office Action—EP 10171558.9.
Aug. 2, 2017—Canadian Office Action—2,713,046.
Jul. 26, 2018—Canadian Office Action—CA 2,713,046.
May 28, 2019—EP Office Action—EP 10171558.9.

PRIORITIZED CALL SESSIONS

CROSS-REFERENCE TO RELATED APPLICATIONS

This application is a continuation of U.S. patent application Ser. No. 15/622,466, filed Jun. 14, 2017, which is a continuation of U.S. patent application Ser. No. 14/151,102, filed Jan. 9, 2014, which is a continuation of U.S. patent application Ser. No. 13/972,165, filed Aug. 21, 2013, which is a continuation of U.S. patent application Ser. No. 12/544,551, filed Aug. 20, 2009, each of which is titled "Prioritized Call Sessions," and each of which is incorporated by reference herein as to its entirety.

BACKGROUND

It is under some circumstances desirable to give a specific device prioritized use of an outgoing communication channel. One example is an alarm system in a residence or business. Alarm systems are often configured to generate an outgoing telephone call to an alarm monitoring company or other destination if a break-in, fire or other event triggers the alarm. Typically, such alarms and other devices in a premises are connected to a conventional analog telephone line using a RJ31X connector or through some other type of hardware-based line seizure device. If triggered, the alarm system can seize that telephone line and drop any other call that might currently be taking place. Although this arrangement has worked well, it is at best an incomplete solution in other communication environments.

SUMMARY

This Summary is provided to introduce a selection of concepts in a simplified form that are further described below in the Detailed Description. This Summary is not intended to identify key features or essential features of the invention.

In at least some embodiments, a call handling device in a subscriber premises has multiple local network interfaces for communication with an alarm or other prioritized end device and with other end devices such as cordless handsets. The call handling device further includes an interface to an external network and is configured to establish multiple concurrent call sessions between the end devices and the external network. The call sessions could include voice calls, and may be established using multiple telephone numbers or other call session identifiers assigned to the call handling device or to a subscriber account with which the call handling device is associated. When the prioritized end device requests that a call session be established, the call handling device may initially determine if a first of the call session identifiers is available. If so, the requested call session can be established using that first identifier. If the first identifier is in use for a call session of another end device, the call handling device may then determine if any of the other call session identifiers is available. If so, one of those other identifiers can be used to establish the call session for the prioritized end device. If all of the other identifiers are in use for call sessions of other end devices, one of those call sessions can be dropped and the identifier previously used for the dropped session can be used to establish the requested call session for the prioritized end device.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

Figure 1:
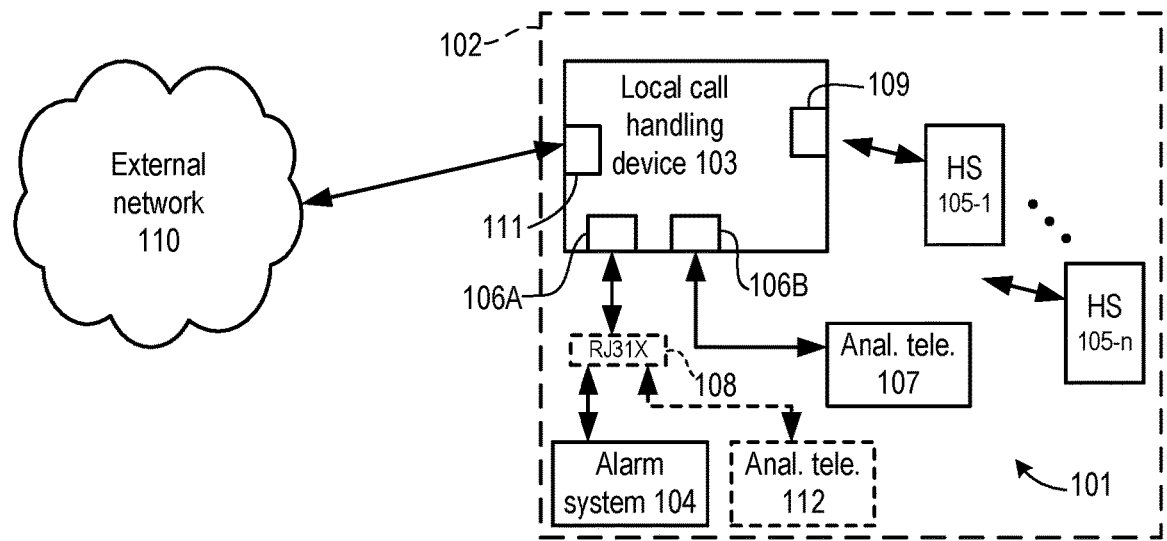
FIG. 1 is a diagram of an environment in which at least some embodiments may be implemented.

FIG. 1 is a diagram of an environment in which at least some embodiments may be implemented. A local network 101 is situated in a subscriber premises 102. Local network 101 includes a call handling device 103, an alarm system 104 and a plurality of handset end devices 105-1 through 105-n. Call handling device 103, which is described in more detail below, may include components configured to perform operations of an Embedded Media Terminal Adapter (EMTA), an Embedded Digital Voice Adapter (EDVA) or another type of local communication gateway.

Figure 2:
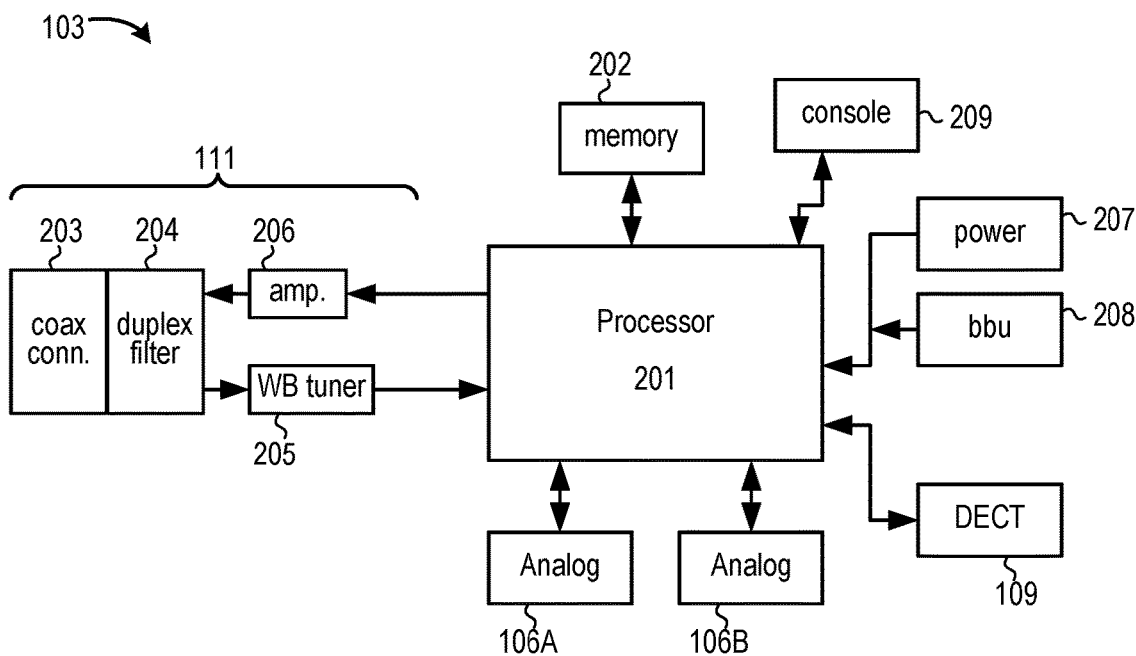
FIG. 2. is a block diagram showing additional details of the call handling device in FIG. 1.

Call handling device 103 communicates with alarm system 104 over a first analog interface 106A and with an analog telephone 107 over a second analog interface 106B. In particular, each of interfaces 106A and 106B permits conventional analog telephony devices to communicate via call handling device 103. In the embodiment of FIGS. 1 and 2, each of interfaces 106A and 106B includes an RJ-11 connector and a SLIC (Subscriber Line Interface Circuit). The SLIC is connected to an analog-to-digital converter (ADC) within call handling device 103 that converts an analog input signal (e.g., tones or other input from alarm system 104, a voice signal from an analog telephone) into digital samples prior to sending the input signal to the processor of call handling device 103. In some embodiments, and as shown in broken lines, a RJ-31X connector 108 (or other type of line seizure device) can be used to connect alarm system 104 and additional analog devices (e.g., another analog telephone 112) to interface 106A. In this manner, multiple devices can share analog interface 106A, but alarm system 104 can (using RJ-31X connector 108) seize interface 106A from telephone 112 and other devices sharing interface 106A.

Handset end devices 105-1 through **105-*n* communicate with call handling device 103 over DECT (Digital Enhanced Cordless Telephone) interface 109. Interface 109 includes a wireless transceiver that converts radio signals received from handsets 105-1 through 105-*n* into pulse-code modulated (PCM) signals and provides those signals to the processor of call handling device 103. The transceiver similarly converts PCM signals received from that processor into radio communications to handsets 105-1 through 105-*n***.

Call handling device 103 also communicates with an external network 110 over a packet data interface 111. In some embodiments, packet data interface 111 includes a coaxial cable connection over which data is carried according to one or more specifications of the Data Over Cable System Interface Specifications (DOCSIS). Call handling device 103 establishes call sessions between end devices and external network 110. For example, a user of handset end device 105-1 may wish to establish a voice communication call session with a party at a remote device located in (or reachable through) external network 110. In response to user input, end device 105-1 transmits a signal to call handling device 103 indicating a request to establish the call session. Call handling device 103 then communicates with one or more elements in external network 110 that set up the call session with the called party. In some embodiments, the elements in external network 110 with which call handling device 103 communicates to establish call sessions include one or more Cable Modem Termination Systems (CMTS) and/or one or more Call Management Servers (CMS). In still other embodiments, the external network elements with which call handling device 103 communicates to establish call sessions may include one or more IP Multimedia Subsystem (IMS) elements. In a similar manner, a party using a device in external network 110 (or communicating through external network 110) may attempt to establish a call session with a user at premises 102. Upon receiving communications over packet data interface 111 indicating the externally-initiated attempt to establish a call, call handling device 103 completes the call session by establishing communication with one or more end devices.

In many cases, a call session may be a voice call session that will appear to the user as a conventional telephone call. For example, external network 110 may be the network of a Multiple Services Operator (MSO) providing cable television (CATV) services, high-speed data services and/or Voice over Internet Protocol (VoIP) or other type of packet-based telephony services. Other types of call sessions may also be established through call handling device 103, however. For example, some call sessions may involve transfer of data used to generate text, graphics or other visually-perceptible material on an end device. Some call sessions may be primarily one-way communication sessions (e.g., streaming audio or video).

When establishing a call session, call handling device 103 associates the session with a call session identifier. A call session identifier can be a telephone number (TN) and/or may include other data. In networks employing Network-based Call Signaling (NCS) call setup, an identifier may include a NCS ID that is mapped to a particular telephone number. In such a circumstance, the call session might appear to the user as though it were being carried over a telephone "line" corresponding to that TN. However, the call session would actually comprise a collection of data packets that are identified by (or otherwise correspond to) the telephone number and/or other call session identifier. Other simultaneously occurring call sessions would then comprise other groups of data packets that correspond to different TNs (and/or other type of session identifiers).

In the example of FIG. 1, the operator of network 110 has assigned N call session identifiers to the subscriber account associated with premises 102. As used herein, a "subscriber" is a person, corporation or other entity that has arranged to obtain access to, and one or more services from, network 110 and an "account" is a construct used to group various data items related to providing a subscriber with services in the network. In the current example, the operator of network 110 has established an account for premises 102 and associated that account and its assigned TNs with call handling device 103. This is only one example, however, and an account need not be assigned to a particular type of entity or be associated with a single premises or call handling device.

When a call session is established, one of the TNs assigned to the premises 102 account (or another call session identifier corresponding to one of the TNs) is used to identify data packets that are part of that call session. While that call session is ongoing, and in at least some embodiments (e.g., embodiments using NCS signaling), the same TN is not used in connection with other call sessions. If all of the call session identifiers are associated with ongoing call sessions when a user or device seeks to establish another call session, no identifier will be available. Until one of the session identifiers is freed (e.g., by ending one of the ongoing call sessions), call handling device 103 will not establish a new call session.

In theory, the number of concurrent call sessions conducted through a call handling device is only limited by the information carrying capacity of the connection between a call handling device and an external network. As a practical matter, however, there are often other constraints on the number of concurrent sessions. For example, increasing the number of concurrent call sessions that can be accommodated increases the complexity of a call handling device. Increased complexity usually increases device cost. Accordingly, economic concerns may prevent building of call handling devices able to accommodate more than a few concurrent sessions. Regulatory concerns could also limit the number of concurrent sessions permitted through a particular call handling device. In some embodiments, the number of call session identifiers assigned to an account may thus be different from the maximum number of concurrent call sessions. As but one example, the operator of network 110 may assign five call session identifiers to the premises 102 account (i.e., N=5), but call handling device 103 may only be able to accommodate four simultaneous call sessions (e.g., up to three call sessions using interface 109 and a call session using one of interfaces 106A and 106B).

FIG. 2 is a block diagram showing additional details of call handling device 103 from FIG. 1. A main processor 201 is configured to execute instructions so as to perform various operations as described herein, to perform various DOCSIS MAC and PHY (physical) layer operations, to perform call setup and other call handling procedures in accordance with NCS protocols (as described in PACKETCABLE specifications available from Cable Television Laboratories, Inc. of Louisville, Colo.), and to control operation of other components of call handling device 103. Instructions executed by main processor 201 may be hard-wired logic gates and/or may be instructions read from memory 202. Main processor 201 communicates with external network 110 across an interface 111 that includes a coaxial cable connector 203, a duplex filter 204, a wideband tuner 205 and an upstream communication amplifier 206. As indicated above, call handling device 103 communicates with alarm system 104 over analog interface 106A, with analog telephone 107 over analog interface 106B, and with handsets 105-1 through 105-n over DECT interface 109. In some embodiments, call handling device 103 may include additional interfaces that have hardware and/or firmware that facilitate communications with numerous other types of end devices. Such interfaces can include a USB interface, a MOCA (Multimedia Over Coax) interface, a 2.4 GHz WiFi interface, a 5 GHz WiFi interface, and/or an Ethernet interface. A power supply 207 and/or battery backup 208 provide electrical power. User input to call handling device 103 may be provided from an end device over one of the aforementioned interfaces or via a separate collection of buttons or other controls in a console 209. In addition to NCS call setup and handling and other operations described herein, call handling device 103 could in some embodiments also be configured to act as a local gateway for other types of services received via interface 111 (e.g., CATV or other broadcast video programming, high speed data service, etc.).

Processor 201 is configured to prioritize any communications through first analog interface 106A. In this manner, a prioritized end device can be connected to interface 106A and be assured of the ability to establish a call session. Alarm system 104 is the prioritized end device in the present example, but this need not be the case. In at least some embodiments, processor 201 associates both first analog interface 106A and second analog interface 106B with a first NCS ID (or other call session identifier). Any of handset devices 105-1 through 105-n can initiate call sessions that use the first NCS ID, however. Those handsets may also initiate call sessions that use any of the other NCS IDs available to call handling device 103. Devices communicating through interface 106B (telephone 107) can initiate call sessions that use the first NCS ID, but cannot initiate call sessions using other NCS IDs. When alarm 104 is triggered, however, any pre-existing call session over interface 106B will be dropped so that alarm system 104 can use the first NCS ID. If there is no pre-existing call session over interface 106B but the first NCS ID is being used in a call session for one of handsets 105-1 through 105-n, processor 201 will attempt to find another NCS ID for use in the prioritized call session that alarm system 104 is initiating. If no other NCS IDs are free, processor 201 will drop the call session that is currently utilizing the first NCS ID and allow alarm 104 to use that NCS ID.

Figure 3:
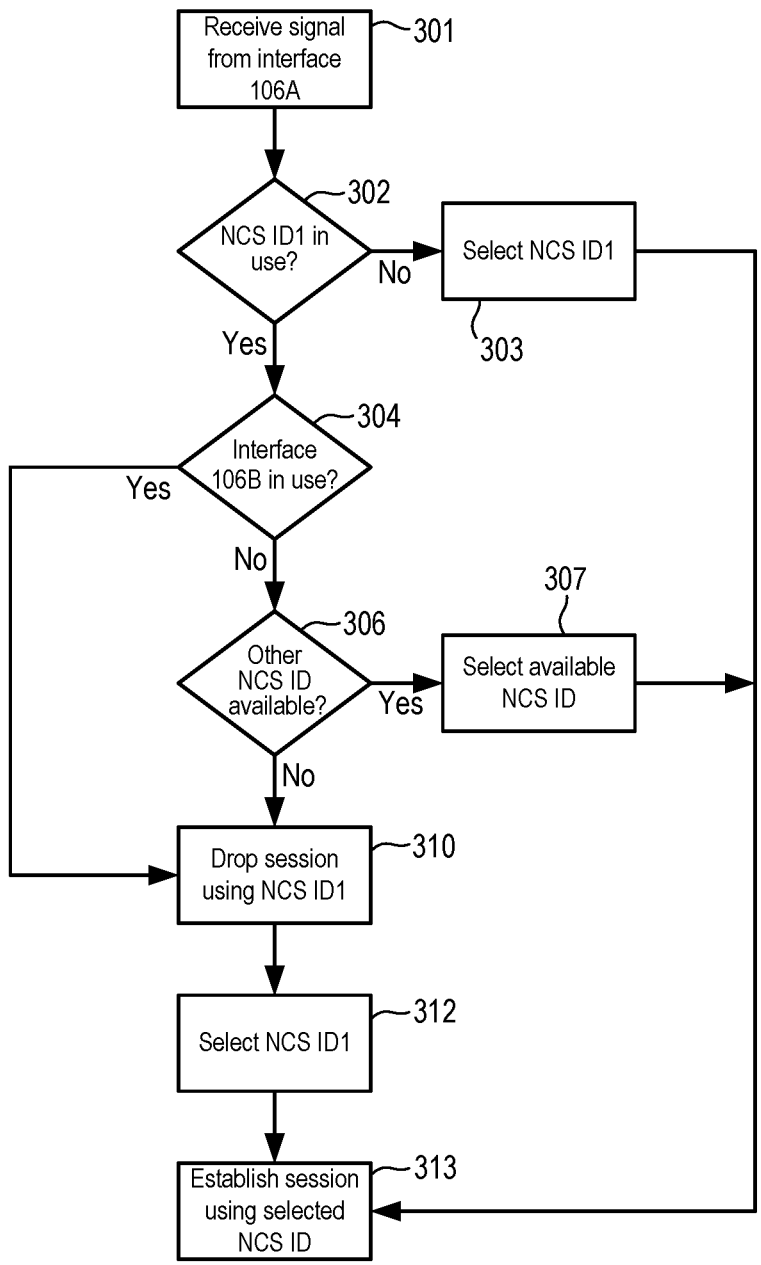
FIG. 3 is a flow chart showing operations performed by a processor, in a local call handling device according to some embodiments, in response to a request from an alarm system to establish a call session.

FIG. 3 is a flow chart showing operations performed by processor 201 in response to a request from alarm system 104 to establish a call session. The algorithm of FIG. 3 assumes that each of the N TNs assigned to the premises 102 account by the operator of network 110 is mapped to a corresponding NCS ID. In particular, TN1 is mapped to NCS ID1, TN2 is mapped to NCS ID2, . . . , and TNN is mapped to NCS IDN. Moreover, NCS ID1 (TN1) is associated with interfaces 106A and 106B. The algorithm of FIG. 3 further assumes that any of handsets 105-1 through 105-n communicating through interface 109 of call handling device 103 can use any of those NCS IDs/TNs that is not currently being used for a pre-existing call session.

In block 301, processor 201 receives a signal indicating that a device communicating through analog interface 106A is requesting that a call session be established. In response, processor 201 proceeds to block 302 and determines if a first NCS ID (NCS ID1) is currently in use for an ongoing call session. If not, processor 201 proceeds on the "no" branch to block 303 and selects NCS ID1. Processor 201 then proceeds to block 313 and establishes a prioritized call session for the end device on interface 106A using the selected NCS ID. As part of block 313, processor 201 may also disable interface 106B until the prioritized call session is completed. In this manner, a call session initiated by alarm system 104 would not be interrupted if analog telephone 107 were to go off-hook during that prioritized call session.

If in block 302 processor 201 determines that NCS ID1 is currently in use, processor 201 proceeds to block 304 on the "yes" branch and determines if NCS ID1 is in use for a call session involving a device communicating through second analog interface 106B. If so, processor 201 proceeds on the "yes" branch to block 310 (described below). If not, processor 201 proceeds on the "no" branch to block 306 and determines if there is another NCS ID assigned to the premises 102 account that is not being used for an ongoing call session. If so, processor 201 proceeds to block 307 on the "yes" branch and selects one of the unused NCS IDs. Processor 201 can make the selection in block 307 based on NCS ID (e.g., select NCS ID2 if it is free, else select NCS ID3, etc.) or in some other manner From block 307, processor 201 proceeds to block 313 and establishes a prioritized call session for the end device on interface 106A using the selected NCS ID.

Returning to block 306, processor 201 proceeds on the "no" branch to block 310 if all other NCS IDs are in use for ongoing sessions. In block 310, processor 201 drops the session using NCS ID1. If block 310 is reached from the "no" branch of block 306, a call session is not currently occurring through interface 106B, and identifiers NCS ID1 through NCS IDN are being used for call sessions by handsets communicating through interface 109. In such a case, the user(s) of handset(s) in the pre-existing NCS ID1 call session will hear that session being interrupted, but pre-existing call sessions using other NCS IDs will not be affected. If block 310 is reached from the "yes" branch of block 304, the pre-existing NCS ID1 call session could be occurring (a) solely over interface 106B, or (b) over both of interfaces 106B and 109 (e.g., a user of one of handsets 105-1 through 105-n may have bridged into a call session initially established over telephone 107, or vice versa). In case (a) the user of telephone 107 will hear the pre-existing call session being interrupted, but any call sessions through interface 109 using other NCS IDs will not be affected. In case (b), the user of telephone 107 and users of handset(s) bridged into the pre-existing NCS ID 1 call session will hear that session being interrupted, but any call sessions through interface 109 using other NCS IDs will not be affected.

After dropping the pre-existing NCS ID1 call session in block 310, processor 201 proceeds to block 312 and selects NCS ID1. From block 312, processor 201 proceeds to block 313 and establishes a prioritized call session for the end device on interface 106B using the selected NCS ID.

Figure 4:
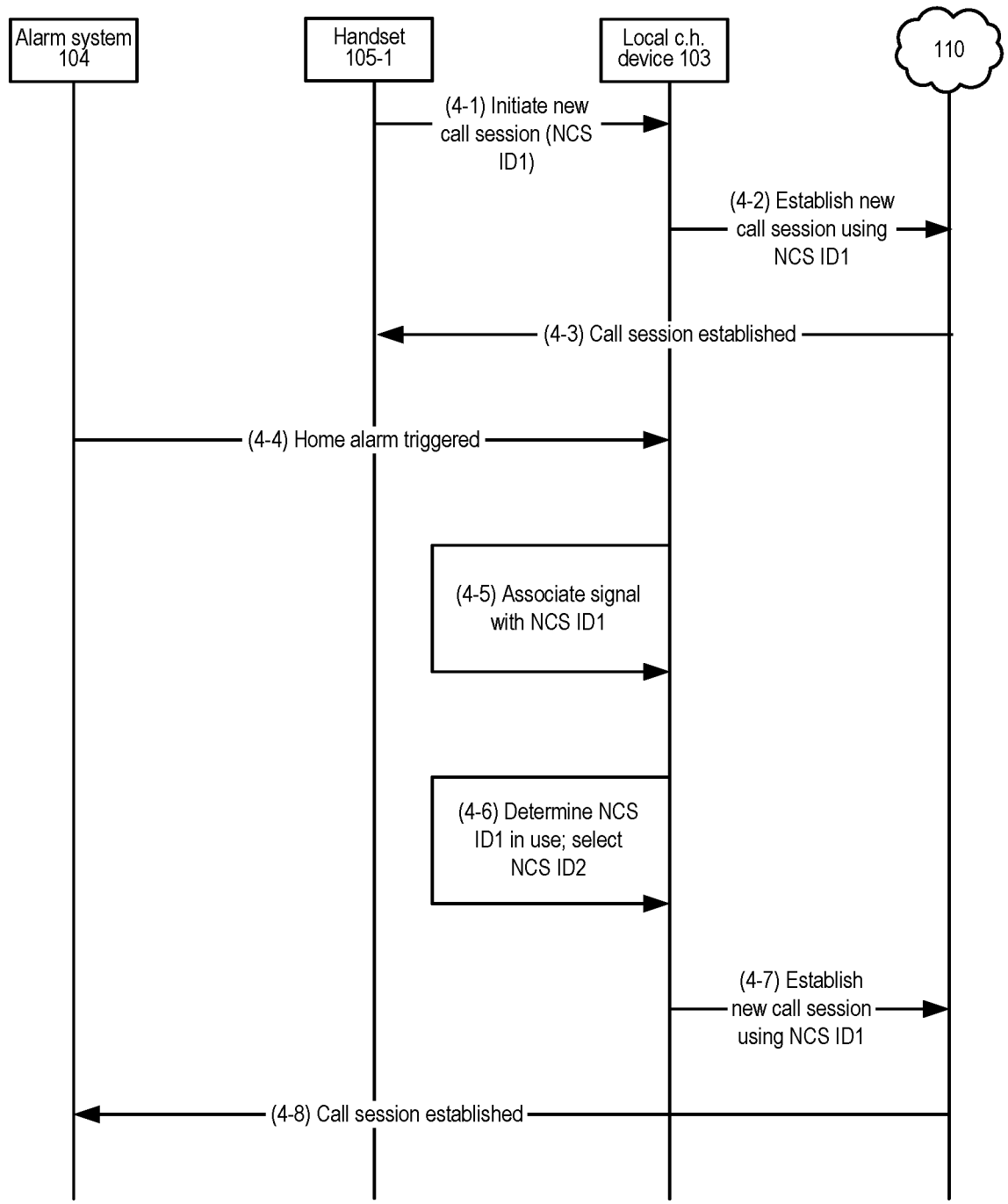
FIGS. 4 and 5 are communication diagrams showing establishment of a call session for an alarm system according to some embodiments.

FIG. 4 is a communication diagram showing the establishing of a call session for alarm system 104 using an NCS ID other than NCS ID1. At line 4-1, handset device 105-1 sends a signal to call handling device 103 indicating a request to establish a call session using NCS ID1. Call handling device 103 then establishes that call session, as shown at lines 4-2 and 4-3. While that NCS ID1 call session is ongoing, alarm system 104 is triggered and sends a signal to call handling device 103 indicating a request to establish a call session (line 4-4). Because the signal was received over interface 106A (FIG. 2), processor 201 of call handling device 103 initially associates the signal with NCS ID1 (line 4-5). Upon determining that NCS ID1 is in use for another call session, and upon determining that other call session does not involve interface 106B, call handling device 103 selects another, unused, NCS ID (NCS ID2) at line 4-6. Using NCS ID2, call handling device 103 establishes a call session for alarm system 104 at lines 4-7 and 4-8.

Figure 5:
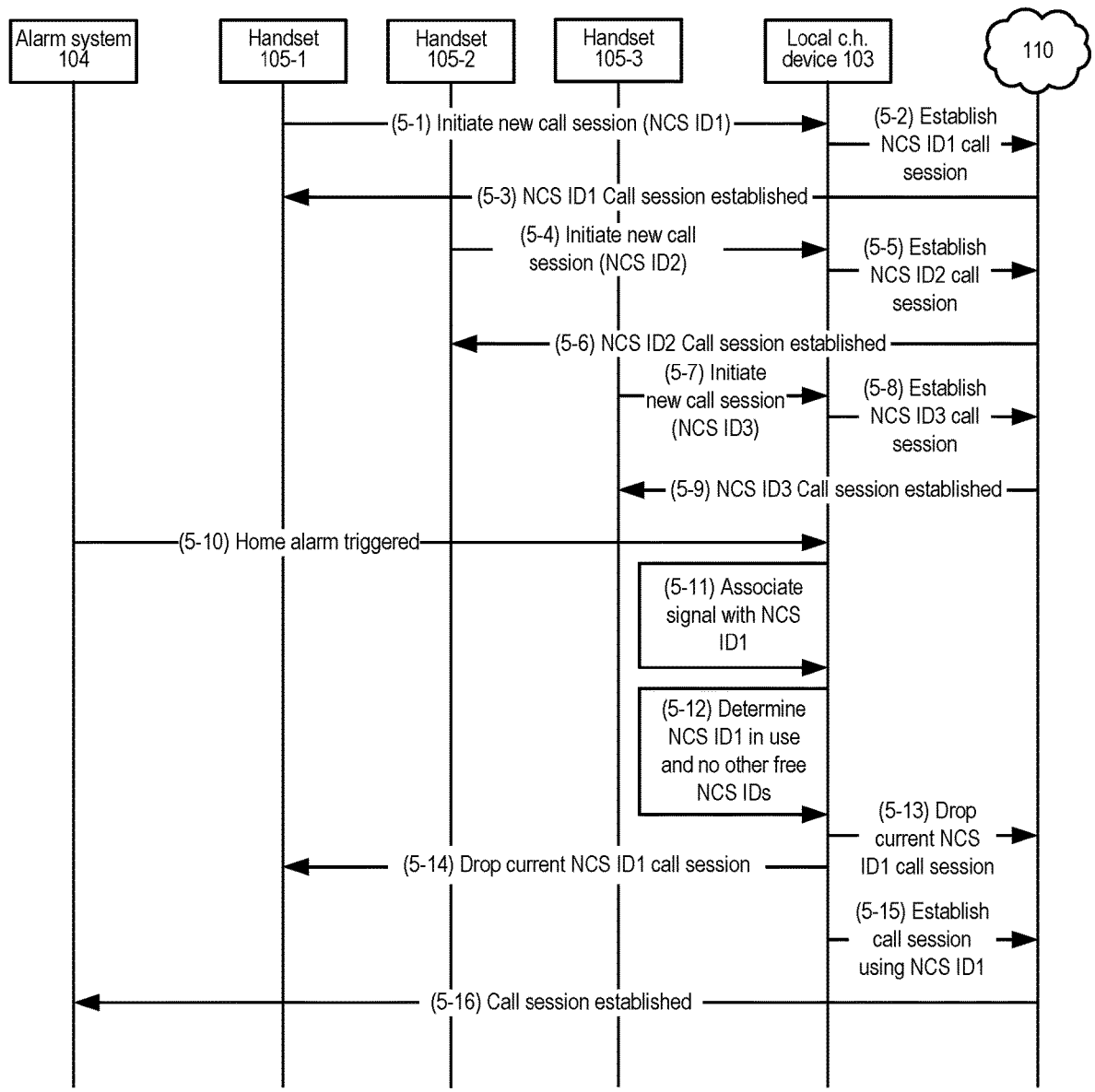

FIG. 5 is a communication diagram showing the establishing of a call session for alarm system 104 using NCS ID1. The example of FIG. 5 assumes that call handling device 103 can establish up to three concurrent call sessions, that the premises 102 account is assigned TN1, TN2 and TN3 (NCS ID1, NCS ID2 and NCS ID3), and all NCS IDs are initially available. As shown by lines 5-1 through 5-3, lines 5-4 through 5-6, and lines 5-7 through 5-9, each of end devices 105-1 through 105-3 has sent a signal to call handling device 103 requesting establishment of a call session, with corresponding sessions being established using NCS ID1, NCS ID2 and NCS ID3. At line 5-10, and while call sessions using NCS ID1 through NCS ID3 are ongoing, alarm system 104 is triggered and sends a signal to call handling device 103 indicating a request to establish a call session. Because the signal was received over interface 106A, processor 201 of call handling device 103 initially associates the signal with NCS ID1 (line 5-11). At line 5-12, call handling device 103 determines that NCS ID1 is in use and that no other NCS IDs are available. Call handling device 103 drops the call session of end device 105-1 using NCS ID1 at lines 5-13 and 5-14. Using NCS ID1, call handling device 103 establishes a call session for alarm system 104 at lines 5-15 and 5-16.

In other embodiments, a call handling device may be similar to call handling device 103 of FIGS. 1 and 2, but instead be configured to perform call setup and other call handling procedures in accordance with Session Initiation Protocol (SIP). In at least some such embodiments, a unique SIP URI (uniform resource identifier) is assigned to each end device (including the alarm system) and used when a call session is established. In some such embodiments, multiple end devices in a local network can participate in concurrent sessions using the same TN. In each of those sessions, the URI of each end device participating in the session is inserted into the SIP "From" address field by the call handling device. Elements within the external network then set up the concurrent call sessions such that each is associated with the same TN. Thus, the alarm system could participate in a first session using a particular TN (with the URI of the alarm system in the SIP "From" address field) and other end devices could participate in concurrent sessions using the same TN (with URIs of the other devices inserted into the SIP "From" address fields in those other sessions).

Figure 6A:
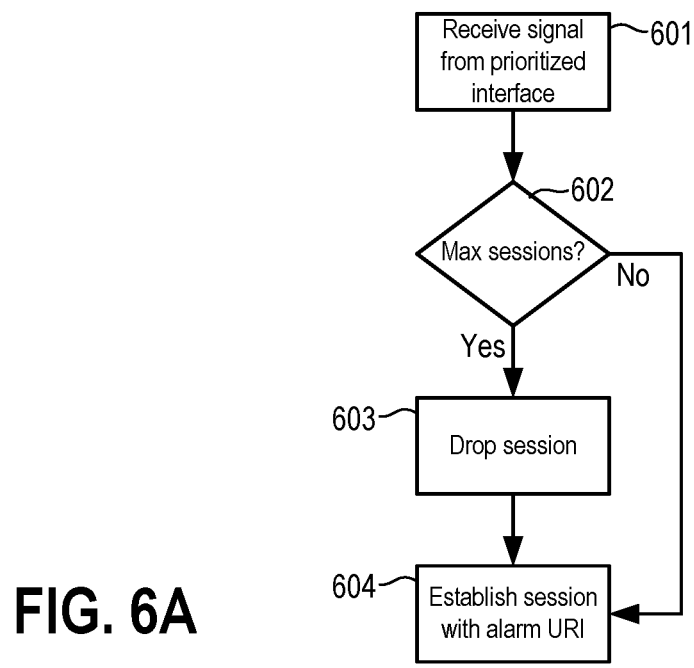
FIGS. 6A and 6B show operations of a processor, in a local call handling device according to some further embodiments, using SIP signaling.
Figure 6B:
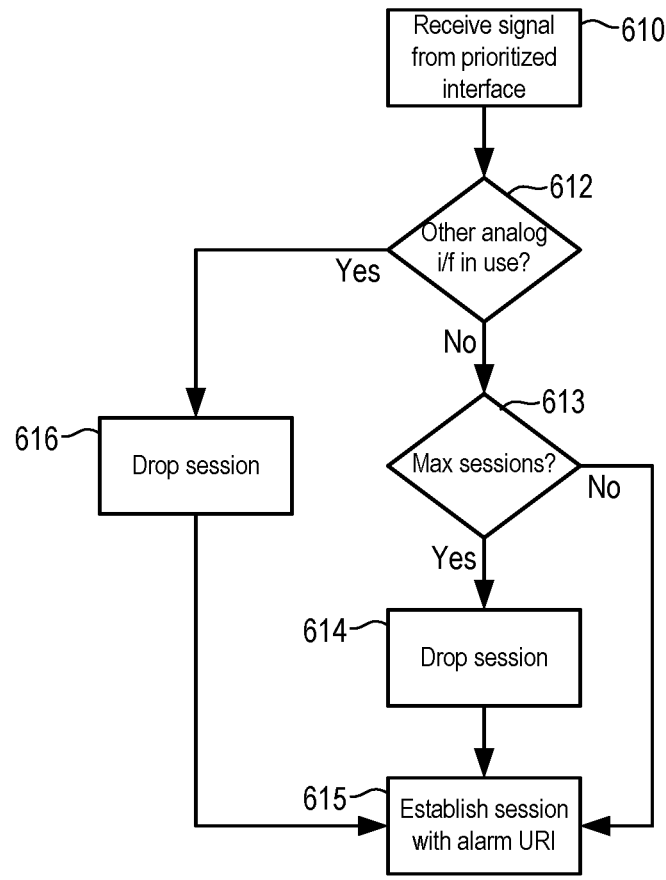

If there is no limitation on the number of concurrent SIP call sessions that the call handling device in a local network could maintain (or if the maximum number of sessions has not been exceeded), and assuming that an alarm system is not sharing an analog interface with another end device that has an ongoing call session, there would be no need to drop a SIP session of one end device to establish a SIP session for the alarm system. If there is a limitation on the number of concurrent SIP sessions, however, the local call handling device could be configured to perform operations such as are shown in FIG. 6A or 6B. The operations of FIGS. 6A and 6B could be performed by a call handling device that is similar to call handling device 103 of FIGS. 1 and 2. Such a call handling device could have the same components shown in FIG. 2, except that that the processor of such a call handling device could be configured to execute (and/or the memory of such a device could store) instructions for carrying out SIP-based operations such as shown in FIG. 6A or 6B.

Turning to FIG. 6A, the processor of the call handling device receives a signal in block 601 indicating a request by an end device on a prioritized interface to establish a SIP session. In response, the processor proceeds to block 602 and determines if the number of current SIP sessions exceeds a maximum. If not, the processor proceeds on the "no" branch to block 604 and allows the SIP session for the alarm system to be established. If the call handling device corresponds to an account that has multiple TNs, the call session established in block 604 can (based on the alarm system URI in the SIP From field) be associated with a predetermined TN that is assigned to the alarm system. In this manner, the alarm monitoring company will receive caller identification data that corresponds to that predetermined TN. If the maximum number of SIP sessions are ongoing, the processor instead proceeds on the "yes" branch to block 603 and drops one of those sessions. From block 603, the processor then proceeds to block 604 and allows the SIP session for the alarm system to be established using the URI of the alarm system. Other call sessions may also be ongoing through other local communication interfaces of the call handling device, with such other call sessions using the same TN as the alarm system but involving devices having different URIs.

In some additional embodiments employing a SIP-based call handling device, each of two analog interfaces such as interfaces 106A and 106B of FIG. 1 could be assigned the same SIP URI. The call handling device could then be configured to prioritize a call session initiated over one of those analog interfaces so as to drop a pre-existing call session over the other of those analog interfaces. FIG. 6B is a flow chart showing operations by a processor in such an embodiment. In block 610, the processor of the call handling device receives a signal on a prioritized one of the two analog interfaces indicating a request to establish a SIP session. The processor then determines in block 612 if there is a pre-existing call session over the other analog interface. If so, the processor proceeds to block 616 and drops the call session occurring over the other analog interface. From block 616 the processor proceeds to block 615 (described below). If in block 612 the processor determines there is no pre-existing call session over the other analog interface, the processor proceeds to block 613 and determines if the number of current SIP sessions exceeds a maximum. If not, the processor proceeds on the "no" branch to block 615 and allows the SIP session to be established over the prioritized analog interface using the SIP URI assigned to the analog interfaces. If the call handling device corresponds to an account that has multiple TNs, and as indicated above in connection with FIG. 6A, the call session established in block 615 can be associated with a predetermined TN that is assigned to the alarm system. If the maximum number of SIP sessions are ongoing, the processor instead proceeds on the "yes" branch from block 613 to block 614 and drops one of those sessions. From block 614, the processor then proceeds to block 615 and allows the SIP session to be established over the prioritized interface using the SIP URI assigned to the analog interfaces. Other call sessions may also be ongoing through other local communication interfaces of the call handling device, with such other call sessions using the same TN as the alarm system but involving devices having different URIs.

Other embodiments include numerous variations on the devices and techniques described above. In some embodiments, for example, the local call handling device is configured to establish a call session for an alarm system using a specific TN (or a TN chosen from a few specified TNs) regardless of whether other TNs may be free. In some cases, for example, an alarm company with which an alarm system attempts to establish a call session may only recognize a specific TN (or a few specific TNs) as being associated with a particular premises. If another TN is used, the alarm company might be delayed in responding.

Figure 7:
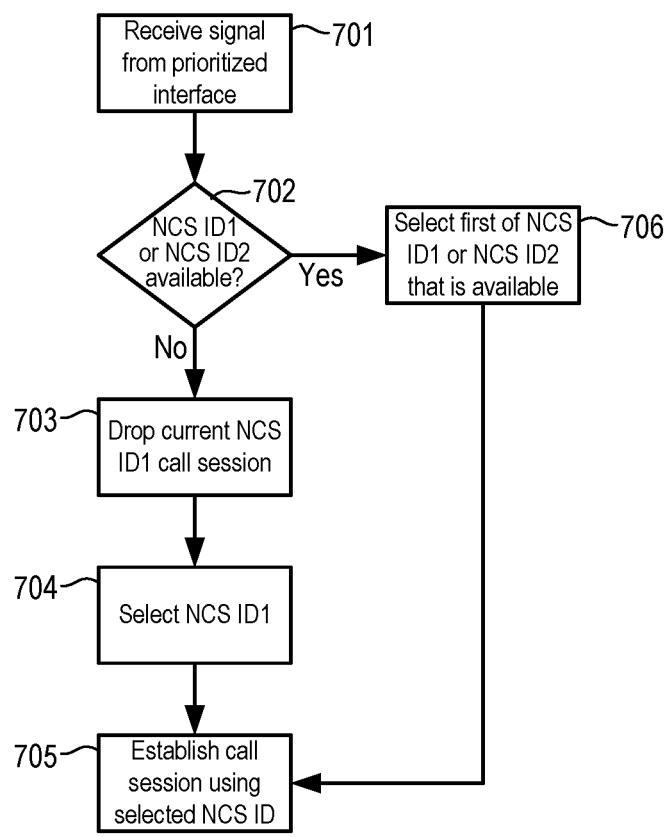
FIG. 7 is a flow chart showing operations performed by a processor, in a local call handling device according to some additional embodiments, in response to a request from an alarm system to establish a call session.

FIG. 7 is a flow chart showing operations performed by a processor of a call handling device in some such embodiments. The operations of FIG. 7 could be performed by a call handling device that is similar to call handling device 103 of FIGS. 1 and 2. Such a call handling device could have the same components shown in FIG. 2, except that the processor of such a call handling device could be configured to execute (and/or the memory of such a device could store) instructions for carrying out operations such as shown in FIG. 7. The example of FIG. 7 assumes that the call handling device employs NCS signaling and can establish call sessions using NCS ID1, NCS ID2 and NCS ID3, but that call sessions from the alarm system must use NCS ID1 or NCS ID2. The example of FIG. 7 further assumes that three concurrent call sessions are allowed. In block 701, the processor receives a signal indicating that a device on a prioritized local interface (e.g., an interface such as interface 106A in FIG. 2) is requesting that a call session be established. In response, the processor determines if either of NCS ID1 or NCS ID2 is available. If so, the processor proceeds on the "yes" branch to block 706 and selects the first of NCS ID1 or NCS ID2 that is available. The processor then proceeds to block 705 and establishes a call session for the device on the prioritized local interface using the selected NCS ID. If neither NCS ID1 nor NCS ID2 is available in block 702, the processor proceeds on the "no" branch to block 703 and drops the call session of NCS ID1. The processor then proceeds to block 704 and selects NCS ID1. The processor then proceeds to block 705 and establishes a call session for the device on the prioritized local interface using the selected NCS ID.

Figure 8A:
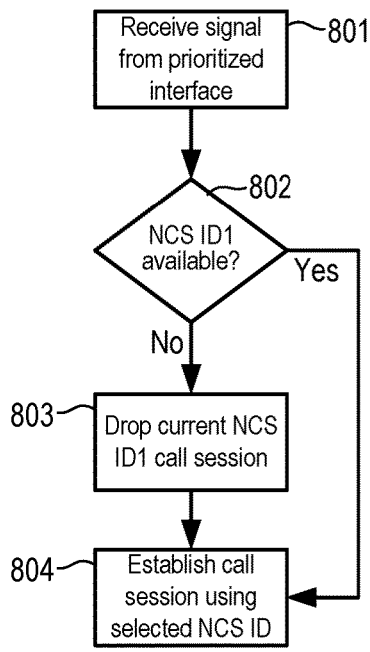
FIGS. 8A and 8B are flow charts showing operations performed by a processor in a local call handling device according to additional embodiments.
Figure 8B:
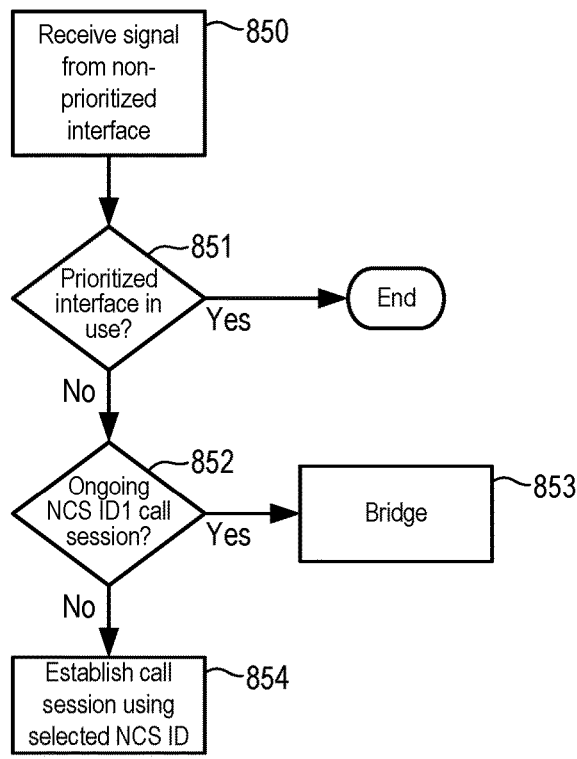

FIGS. 8A and 8B show operations performed by a call handling device that is also similar to (and has the same components as) call handling device 103 of FIGS. 1 and 2, but in which the processor is configured to execute (and/or the memory stores) instructions for carrying out operations such as shown in FIGS. 8A and 8B. That call handling device also includes a first analog interface (similar to interface 106A of FIGS. 1 and 2) that is prioritized and connected to an alarm system, as well as a second analog interface (similar to analog interface 106B of FIGS. 1 and 2) that is connected to an analog telephone. Beginning in block 801 of FIG. 8A, the processor receives a signal indicating that a device communicating through the first (prioritized) analog interface is requesting that a call session be established. The processor proceeds to block 802 and determines if a call session identifier (NCS ID1), corresponding to a telephone number (TN1) associated with the two analog interfaces, is available. If so, the processor proceeds on the "yes" branch to block 804 and establishes a call session using NCS ID1/TN1. While that call session is ongoing, the second (non-prioritized) analog interface is disabled and other devices (e.g., DECT handsets) communicating through other local communication interfaces cannot use NCS ID1/TN1. If in block 802 the processor determines that NCS ID1 is not available, the processor proceeds on the "no" branch to block 803 and drops the current call session using NCS ID1. That current call session may be occurring over the second (non-prioritized) analog interface, over another interface, or may be bridging the second analog interface and a DECT (or other) interface. The processor then proceeds to block 804 and establishes a call session over the prioritized analog interface using NCS ID1.

FIG. 8B shows operations performed by the processor of the same call handling device in response to input over the second (non-prioritized) analog interface. In block 850, the processor receives a signal from the non-prioritized analog interface indicating that a telephone or other device connected to that interface has gone off-hook. In block 851, the processor determines if the prioritized analog interface is in use. If so, the non-prioritized analog interface is disabled and the process ends on the "yes" branch. If the prioritized analog interface is not in use, the processor proceeds to block 852 and determines if NCS ID1/TN1 is in use for a call session over one of the other local interfaces. If so, the processor proceeds on the "yes" branch to block 853 and bridges the device connected to the non-prioritized analog interface into that pre-existing NCS ID1/TN1 call session. If NCS ID1/TN1 is not in use, the processor proceeds on the "no" branch from block 852 to block 854. In block 854 the processor awaits further input (e.g., dialed numbers) and then establishes a call session using NCS ID1.

A call handling device operating as shown in FIGS. 8A and 8B would be useful, e.g., in connection with alarm systems that require a specific NCS ID and/or TN so that an alarm monitoring facility will receive caller identification data associated with that specific NCS ID and/or TN.

Figure 9:
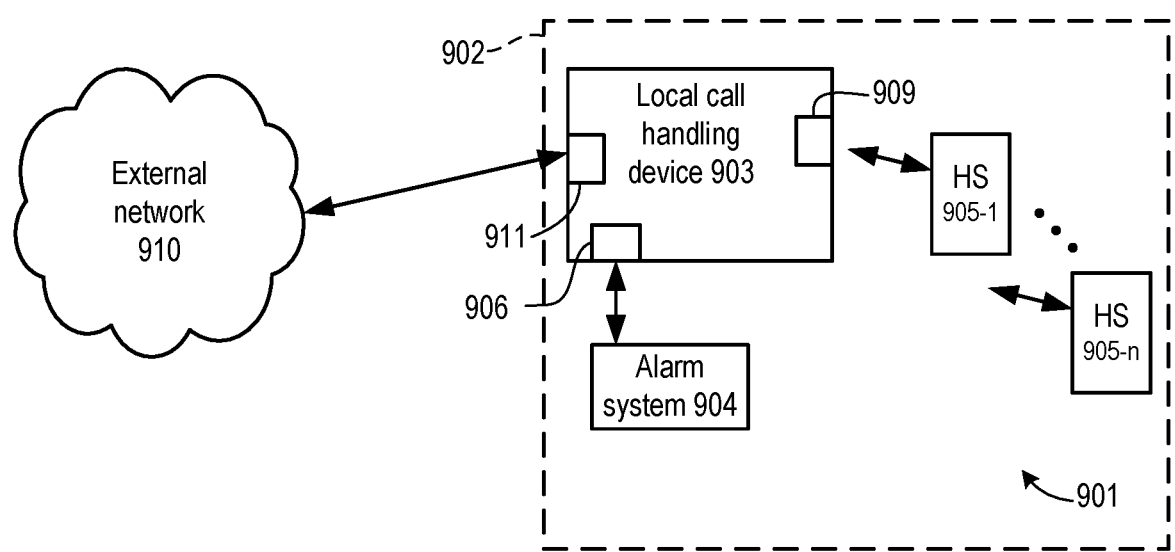
FIG. 9 is a diagram of an environment in which at least some additional embodiments may be implemented, and showing a local call handling device according to certain additional embodiments.

FIG. 9 is a diagram of an environment in which at least some additional embodiments may be implemented, and showing a local call handling device 903 according to certain additional embodiments. Call handling device 903 is similar to call handling device 103 of FIG. 1 and, except as described below, has components similar to those of call handling device 103. For example, device 903 includes a DECT interface 909 over which device 903 communicates with handsets 905-1 through 905-n and a packet data interface 911 for communication with external network 910. Unlike call handling device 103, however, device 903 only has a single analog interface 906 connected to an alarm system 904. Moreover, the processor of device 903 is configured to execute (and/or the memory stores) instructions for carrying out operations such as shown in FIG. 10A or 10B.

Figure 10A:
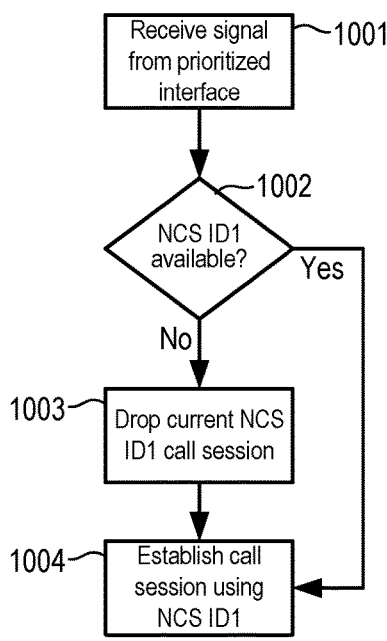
FIGS. 10A and 10B are flow charts showing operations performed by a processor in the local call handling device of FIG. 9.

For example, FIG. 10A shows operations performed when device 903 is configured to always drop pre-existing call sessions using a specific identifier (NCS ID1/TN1) associated with interface 906 when alarm system 904 is triggered. Beginning in block 1001, the processor of device 903 receives a signal indicating the device on interface 906 is attempting to initiate a call session. In block 1002 the processor determines if NCS ID1 is in use for a pre-existing call session. If not (i.e., NCS ID1 is available), the processor continues to block 1004 and establishes a call session over interface 906 using NCS ID1. If NCS ID 1 is not available, the processor proceeds from block 1002 on the "no" branch to block 1003 and drops the pre-existing call session using NCS ID1. The processor then proceeds to block 1004 and establishes a call session over interface 906 using NCS ID1.

Figure 10B:
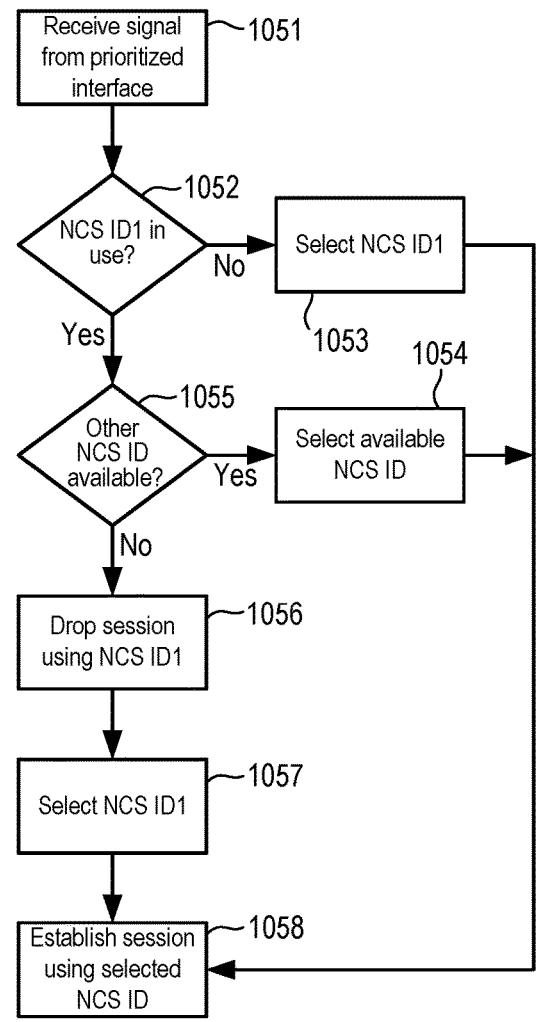

FIG. 10B shows operations performed when device 903 is configured to only drop pre-existing call sessions using a specific identifier (NCS ID1/TN1) if no other identifiers are available. In block 1051 the processor receives a signal indicating the device on interface 906 is attempting to initiate a call session. In block 1052 the processor determines if NCS ID1 is in use for a pre-existing call session. If not, the processor proceeds on the "no" branch to block 1053 and selects NCS ID1. The processor then proceeds to block 1058 and establishes a call session over interface 906 using the selected NCS ID (in this case, NCS ID1). If in block 1052 the processor determines that NCS ID1 is already in use, the process continues on the "yes" branch to block 1055 and determines if any other NCS IDs are free. If so, the processor continues to block 1054 and selects a free NCS ID, and then continues to block 1058. If in block 1055 the processor determines no other NCS ID is free, the processor continues to block 1056 and drops the pre-existing session using NCS ID1. The processor selects NCS ID1 in block 1057 and then proceeds to block 1058.

Figure 11:
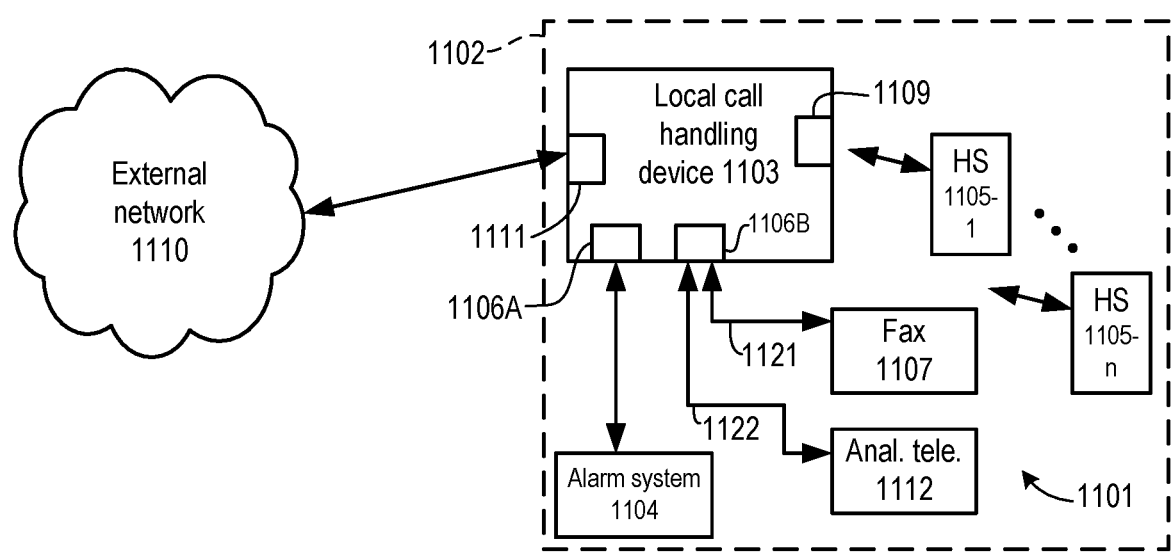
FIG. 11 is a diagram of an environment in which at least some additional embodiments may be implemented, and showing a local call handling device according to one such additional embodiment.

FIG. 11 is a diagram of an environment in which at least some additional embodiments may be implemented, and showing a local call handling 1103 device according to one such additional embodiment. Call handling device 1103 is similar to call handling device 103 of FIG. 1 and, except as described below, has components similar to those of call handling device 103. For example, device 1103 includes a DECT interface 1109 over which device 1103 communicates with handsets 1105-1 through 1105-*n* and a packet data interface 1111 for communication with external network 1110. Device 1103 similarly has an analog interface 1106A connected to alarm system 1104. Unlike call handling device 103, however, interface 1106B is an interface (e.g., an RJ14 interface) that can simultaneous allow separate call sessions over two separate lines 1121 and 1122. For example, first line 1122 could be connected to an analog telephone 1112 engaged in a call session using NCS ID1/TN1 and second line 1121 could be connected to a fax machine 1107 engaged in a call session using NCS ID2/TN2. In some embodiments, the processor of device 1103 is configured to execute (and/or the memory of device 1103 stores) instructions that cause device 103 to associate a specific call identifier (NCS ID1/TN1) with interface 1106A and first line 1122 of interface 1106B. Interface 1106A is then prioritized relative to that associated identifier and the first line of interface 1106B in the same way that interface 106A is prioritized relative to its associated identifier (NCS ID1) and interface 106B in the embodiment of FIGS. 1-3. A call session on the second line 1121 of interface 1106B would not be interrupted by triggering of alarm system 1104 because line 1121 is assigned an identifier (NCS ID2/TN2) other than the identifier (NCS ID1/TN1) associated with interface 1106A. Alternatively, interface 1106A could be prioritized relative to its associated identifier and the first line of interface 1106B in the same way that the first (prioritized) interface in the embodiment of FIGS. 8A and 8B is prioritized relative to NCS ID1 and the second (non-prioritized) interface. In this alternate configuration, a call session on the second line 1121 of interface 1106B would also not be interrupted by triggering of alarm system 1104 because line 1121 is assigned an identifier (NCS ID2/TN2) other than the identifier (NCS ID1/TN1) associated with interface 1106A.

In some embodiments, one of the call handling devices described above may only be provisioned with a single telephone line (e.g., a single NCS ID/TN). For example, an operator of a network providing telecommunications services may charge a higher fee for additional call identifiers/TNs, and a subscriber may not wish to pay a fee for additional identifiers. Some such embodiments having two analog interfaces could operate in a manner similar to that described above in connection with FIGS. 8A and 8B. Some such embodiments having one analog interface could operate in a manner similar to that described above in connection with FIG. 10A.

Certain embodiments may include a call handling device such as is described above, but that can be selectively provisioned so as to disable the prioritization of an analog interface. For example, call handling device 903 in some embodiments includes programming by which device can be selectively configured to disable an interface prioritization feature so as to not drop a pre-existing call session in response to an incoming signal on interface 906. Once device 903 is configured in this manner, device connected to interface 906 and attempting to establish a call session would not interrupt a pre-existing call session of a DECT handset using a NCS ID/TN associated with interface 906. If a pre-existing call session is using the session identifier associated with interface 906, a telephone connected to interface 906 would simply bridge into that call session when that telephone goes off-hook. The ability to disable the prioritization feature would permit use of interface 906 for normal telephony devices in premises that do not have an alarm or otherwise do not need the prioritization functionality.

Returning to FIG. 2, and as previously indicated, some embodiments may include a RJ31X connector or other line seizure device that connects alarm system 104 and another analog device such as telephone 112 to interface 106A. As between alarm system 104 and telephone 112, alarm system 104 will have priority and be able to seize the connection to interface 106A from telephone 112. However, processor 201 will not differentiate between alarm system 104 or telephone 112 when a signal requesting a call session is received over interface 106A. Accordingly, and assuming alarm system 104 is not triggered, telephone 112 also has the power to initiate prioritized call sessions. Such an arrangement could be used, e.g., to create a "hotline" or other type of emergency communication system.

The above discussion of FIGS. 1-7 describes prioritizing a call session over an analog interface 106A relative to a call session over a second analog interface 106B and/or relative to a call session over a DECT interface 109. In some embodiments, a call handling device may also be able to establish call sessions with end devices through USB, MoCA, WiFi, Ethernet and/or other types of interfaces. In some such embodiments, the processor may also be configured to prioritize a call session over one interface (e.g., analog interface 106A) relative to pre-existing call sessions over any of those other interfaces.

Embodiments of the invention include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause a call handling device or other device to carry out operations such as are described herein. As used herein (including the claims), a machine-readable storage medium is a physical structure that can be touched by a human. A modulated signal would not by itself constitute a machine-readable storage medium.

Although some embodiments have been described in the context of packet-based telephony services provided over a coaxial cable, the invention is not limited in this regard. Other embodiments include systems in which a gateway or other device located within a premises communicates with an external network over some other type of physical medium (e.g., fiber optic cable, wireless transmission, twisted pair, etc.) using communications protocols other than those mentioned above. As but one example, a gateway or other device located at a subscriber premises in some embodiments could communicate with an external network using a Digital Subscriber Line (DSL) access network. In some such embodiments, the gateway is similar to that described above in connection with FIG. 2, but with interface 111 replaced with DSL interface hardware and with the processor configured to communicate using appropriate DSL access network protocol(s). As but another example, a gateway or other device located at a subscriber premises in other embodiments could communicate with an external network using a Fiber to the Home (FTTH) Passive Optical Network (PON) access network. A gateway in some such embodiments is also similar to that of FIG. 2, but with interface 111 replaced with PON interface hardware (or a connection to a separate Optical Network Terminal (ONT)) and with the processor configured to communicate using appropriate access network protocol(s) (or communication protocol(s) for interfacing with an ONT).

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. Additional embodiments may not perform all operations, have all features, or possess all advantages described above. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and machine-readable storage media. Any and all permutations of features from above-described embodiments are the within the scope of the invention.

The invention claimed is:

1. A method comprising:
receiving, from an alarm system, a request to access a call connection;
determining that the call connection is in use by a first computing device;
disconnecting the first computing device from the call connection;
connecting the alarm system to the call connection; and
denying a future request from a second computing device, having a priority different from the first computing device, for the call connection while the alarm system is connected to the call connection.

2. The method of claim 1, wherein the second computing device has a lower priority than the first computing device.

3. The method of claim 1, wherein the first computing device has a lower priority than the alarm system.

4. The method of claim 1, wherein the alarm system and the first computing device are in communication with a first interface, and wherein the second computing device is in communication with a second interface.

5. The method of claim 1, wherein the alarm system and the first computing device are in communication with a first interface, the second computing device is in communication with a second interface, and the first interface corresponds to a higher priority than the second interface.

6. The method of claim 5, wherein the first interface comprises an analog interface and the second interface comprises a digital interface.

7. The method of claim 1, further comprising:
denying a future request from a third computing device having a lower priority than the alarm system.

8. A method comprising:
receiving, from an alarm system, a request to access a call connection;
determining that the call connection is in use by a first device using a first communication type;
disconnecting the first device from the call connection;
connecting the alarm system to the call connection; and
denying a future request, for the call connection while the alarm system is connected to the call connection, from a second device using a second communication type.

9. The method of claim 8, wherein the second communication type has a lower priority than the first communication type.

10. The method of claim 8, wherein the first communication type has a lower priority than a priority of the alarm system.

11. The method of claim 8, wherein the alarm system and the first device are in communication with a first interface, and wherein the second device is in communication with a second interface.

12. The method of claim 8, wherein the alarm system and the first device are in communication with a first interface, the second device is in communication with a second interface, and the first interface corresponds to a higher priority than the second interface.

13. The method of claim 12, wherein the first interface comprises an analog interface and the second interface comprises a second analog interface.

14. The method of claim 8, further comprising:
denying a future request from a third device that is associated with a communication type having a lower priority than a priority of the alarm system.

15. The method of claim 14, wherein the alarm system and the first device are in communication with a first interface, the second device is in communication with a second interface, the third device is in communication with a third interface, and the third interface has a lower priority than the first interface.

16. A method comprising:
receiving, by a call handling device and from an alarm system, a request to establish a call connection, wherein:
the call handling device communicates with the alarm system and a first computing device via a prioritized interface,
the call handling device communicates with a second computing device via a non-prioritized interface, and
the first computing device has a higher priority than the second computing device;
dropping a pre-existing call connection used by the first computing device; and
connecting the alarm system to the call connection.

17. The method of claim 16, wherein the alarm system has a higher priority than the first computing device.

18. The method of claim 16, further comprising:
denying a future request from the second computing device for the call connection while the alarm system is connected to the call connection.

19. The method of claim 16, wherein the call handling device communicates with a third computing device via a local interface different from the prioritized interface and the non-prioritized interface.

20. The method of claim 19, wherein the third computing device comprises a handheld cordless phone.

* * * * *

UNITED STATES PATENT AND TRADEMARK OFFICE
CERTIFICATE OF CORRECTION

Page 1 of 1

PATENT NO. : 10,715,884 B2
APPLICATION NO. : 16/156362
DATED : July 14, 2020
INVENTOR(S) : Connelly et al.

It is certified that error appears in the above-identified patent and that said Letters Patent is hereby corrected as shown below:

In the Specification

Column 6, Detailed Description, Line 25:
After "manner", please insert --.--

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*